United States Patent [19]

Coldren

[11] 4,389,021

[45] Jun. 21, 1983

[54] PANEL MOUNTED CONNECTOR FOR USE IN CONFINED AREAS

[75] Inventor: Daniel R. Coldren, Enola, Pa.

[73] Assignee: AMP Incorporated, Harrisburg, Pa.

[21] Appl. No.: 244,520

[22] Filed: Mar. 16, 1981

[51] Int. Cl.$^3$ ......................................... H01R 13/447
[52] U.S. Cl. ................................................. 339/126 R
[58] Field of Search .......... 339/119 R, 126 R, 126 RS

[56] References Cited

U.S. PATENT DOCUMENTS

| | | | |
|---|---|---|---|
| 2,805,405 | 9/1957 | Batcheller | 339/125 |
| 2,891,103 | 6/1959 | Swengel | 174/153 |
| 2,936,329 | 5/1960 | Zasadney | 174/53 |
| 2,968,783 | 1/1961 | Puetz | 339/59 |
| 3,193,226 | 7/1965 | Showalter | 339/126 RS X |
| 3,196,380 | 7/1965 | Krehbiel | 339/126 RS |
| 3,387,253 | 6/1968 | Salners | 339/126 RS X |
| 3,440,594 | 4/1969 | Hopp et al. | 339/59 |
| 3,461,413 | 8/1969 | Randolph et al. | 336/84 |
| 3,706,957 | 12/1972 | Iantorno | 339/126 R |

*Primary Examiner*—Howard N. Goldberg
*Attorney, Agent, or Firm*—Frederick W. Raring

[57] ABSTRACT

Electrical connector intended for use in confined areas has an insulating housing having panel receiving grooves in its oppositely facing endwalls. A closure flap extends from the sidewall which is between the endwalls. The connector is mounted in a panel by providing a panel opening having an enlarged connector assembly portion and an adjoining connector retaining portion. The retaining portion has an outline which conforms to the outline of the connector housing. The connector is assembled to the panel by first passing the connector housing through the connector assembly portion of the panel opening and then moving the housing laterally of its axis into the connector retaining portion. Edge portions of the panel are received in the grooves in the endwalls of the housing and the closure flap covers the connector assembly portion of the opening in the panel.

6 Claims, 6 Drawing Figures

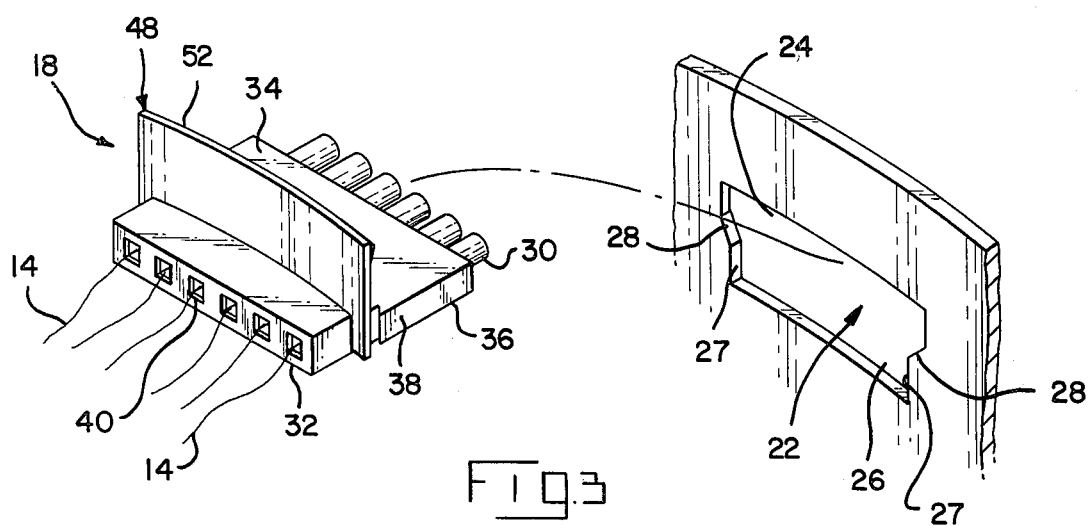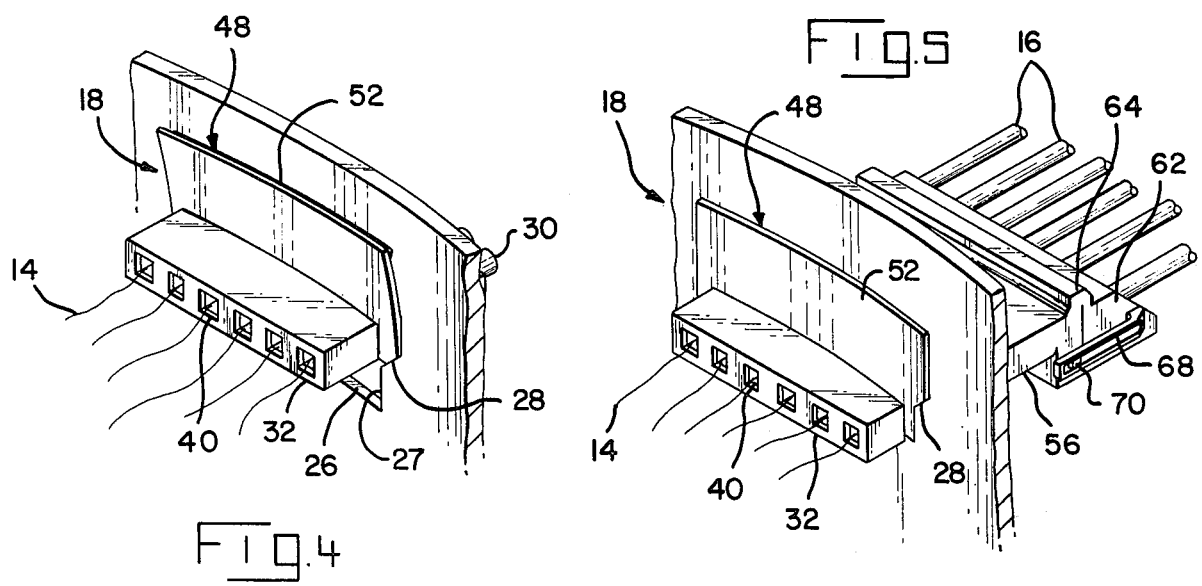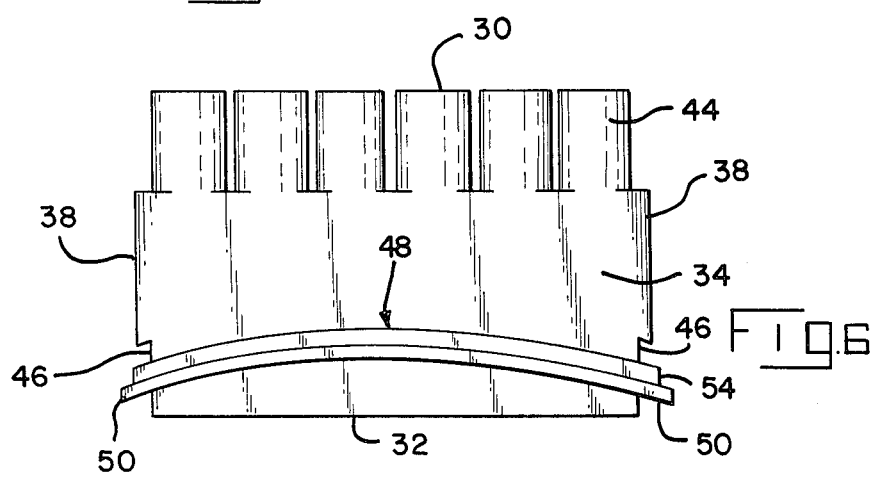

PANEL MOUNTED CONNECTOR FOR USE IN CONFINED AREAS

FIELD OF THE INVENTION

This invention relates to electrical connectors of the type which are mounted in panels or walls of electrical appliances, electrical motors, and the like. The disclosed embodiment is particularly intended for use in an electric motor for connecting the motor windings to the control and power circuits for the motor.

BACKGROUND OF THE INVENTION

In the manufacture of electrical motors, appliances, and other devices having electrical controls, it is common practice to provide connectors on the wires extending through and from the device to make the required connections for the circuitry. When the wires must extend through a panel or housing, it is customary to use a connector of the type which can be mounted in an opening in the panel so that during the manufacturing process, it is merely necessary to install the panel mounted connector in the panel and thereafter mate a complementary connector to the panel mounted connector in order to complete the electrical connections to the control circuits and the power circuits for the device.

There are a wide veriety of connectors available which are intended for mounting in panels; see for example U.S. Pat. Nos. 3,366,729, 3,353,143, and 2,891,103. Connectors of the general type shown in these prior art patents are usually provided with latch arms or other retaining means for latching the connector housing to the panel. To assemble the connector to the panel, it is merely necessary to pass the connector through a panel opening until the latch arms extend through the opening and latch the connector housing to the panel.

Presently available panel mounted connectors, such as those shown in the above identified U.S. patents, are satisfactory for most circumstances, however, under some conditions, they are not entirely suitable and, in fact, they cannot be used at all in some instances. Connectors of the types described above cannot be assembled to a panel under confined conditions, that is, where there is very little clearance in the vicinity of the panel opening for manipulation and handling of the connector by the technician performing the assembly operation. Furthermore, the presence of the latch arms on the connector is sometimes objectionable, since the connector can be easily removed from the panel by flexing the latch arms inwardly towards the connector housing. Under some circumstances, it is highly desirable to discourage removal of the connector housing from the panel for safety reasons and to discourage tampering with the equipment on which the connector is used.

The present invention is directed to the achievement of a connector which can be used to connect the ends of the windings of a motor to insulated conductors which extend to the control and power circuits for the motor. The connector used for this purpose must be usable under confined conditions, for the reason that the windings of an electric motor are in close proximity to the motor housing or shell. Furthermore, a connector suitable for an electric motor should be such that once installed, it can be removed only by the deliberate actions of a qualified technician and cannot be disturbed by tampering on the part of a person who could expose himself to electrical shock.

A connector in accordance with the present invention is installed in a panel opening having an enlarged connector assembly portion and an adjoining connector retaining portion. The connector retaining portion conforms in its outline to the cross-section of the connector housing and the housing is provided with slots on its endwalls which are dimensioned to receive edge portions of the panel. A connector is assembled to the panel by passing the housing through the assembly portion of the opening and then moving the housing laterally into the retaining portion. A closure flap is provided on the housing which completely covers the connector assembly portion of the opening. The closure flap extends into the opening and thereby prevents removal of the housing from the panel under any circumstances other than by a qualified technician.

DESCRIPTION OF THE DRAWINGS

FIGS. 3–5 are views illustrating the assembly of the connector to the stator shell.

FIG. 6 is a top plan view of the connector housing.

PREFERRED EMBODIMENT OF THE INVENTION

Figure 1:
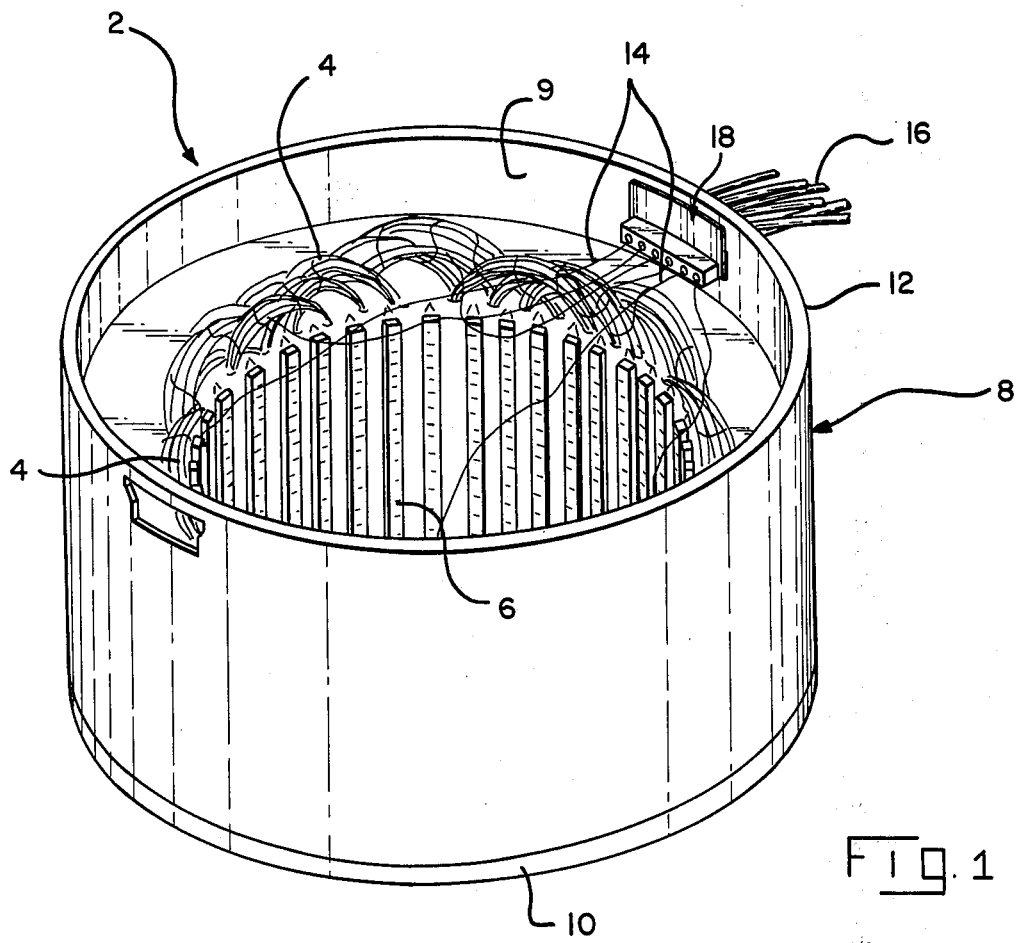
FIG. 1 is a perspective view of a motor stator having a connector in accordance with the invention mounted in the stator shell.

A typical stator 2 of the electric motor comprises a plurality of coil windings 4 which extend around the poles 6 of the stator. The wire in the coil windings is provided with a thin film type insulation of a suitable polymeric material, such as a polyvinyl formal resin. The stator windings and poles are supported in a cylindrical shell 8, the inside surface 9 of which is relatively close to the stator windings. The lower end of the stator shown in FIG. 1 is covered by a circular end cover 10 and it will be understood that after the rotor has been assembled to the stator 2, a similar cover will be assembled to the upper end 12 of the cylindrical shell 8.

During manufacture of the motor, it is necessary to connect the ends 14 of the coil windings 4 to insulated conductors 16 which extend from the motor to the power supply and to the control circuits for the motor. At present, it is common practice in the manufacture of relatively large induction motors to connect the wire 16 to the ends 14 of the windings by crimped electrical connecting devices. The insulated wires 16 are passed through an opening in the shell 8 and connected at a remote location to the power and control circuits for the motor. This is an inconvenient manufacturing process for several reasons, such as the fact that the motor stator 2 must be handled and moved along an assembly line with the ends of the wires 14 dangling from the shell.

In accordance with the present invention, an electrical connector 18 is used to connect the coil wires 4 to the wires 16 which can be mounted in the shell 9 from the inside surface thereof, notwithstanding the confined conditions which exist. The shell 8 is provided with an opening 22 having an enlarged connector assembly portion 24 which adjoins a connector retaining portion 26, these two portions of the opening being separated by a transition section 28.

The connector 18 comprises an insulating housing having a mating face 30, a wire entry face 32, upper and lower sidewalls 34, 36, and oppositely directed endwalls 38. The housing may be of any suitable insulating material which can be injection molded and which is relatively firm, but somewhat flexible, in thin sections. A suitable polyester or nylon composition is commonly used for housings of this type.

The wires 14 are crimped onto terminals 42 which are received in the terminal receiving cavities 40 of the connector. These cavities extend into side-by-side cylindrical enclosures 44 at the mating end 30. These cylindrical enclosures in turn are dimensioned to be received in the cavities 60 of the complementary connector 20.

The oppositely directed endwalls 38 of the housing are provided with slots 46 which are dimensioned to receive the opposed edges 27 of the opening 22. These slots extend arcuately inwardly from the endwalls 38 to accommodate the curvature of the cylindrical shell and the spacing between the inner ends of the slots is equal to, and slightly greater than, the distance between the opposed edges 27 of the connector retaining portion of the opening 22.

A closure flap 48 is integral with, and extends from, the upper sidewall 34 of the housing. This closure flap has side edges 50 and upper edges 52 which are rabbeted, as shown, to define inwardly offset shoulders 54. The flap 48 is arcuate to conform to the curvature of the shell and is dimensioned such that when the connector is installed in the shell, the shoulders 54 will be opposed to, and adjacent to, the edges of the opening 22. The flap 48 should be capable of limited flexure which it must undergo during installation, as will be described below.

As shown in FIG. 3, the connector is installed in the shell by passing the connector housing through the upper connector assembly portion 24 of the opening. The housing can be inclined, as indicated by the broken line in FIG. 3, so that it will clear the coil windings which are adjacent to the inside surface 9 of the shell. When the closure flap 48 is substantially against the inside surface 9 of the shell, the housing is moved downwardly to the position of FIG. 5 in which the opposed edges 27 will be received in the slots 46. The closure flap 48 will cover the upper assembly portion 24 of the opening and will, on the inside surface, overlap the edges of the opening, as shown in FIG. 5. After installation, it is impossible to remove the connector from the outside of the shell without complete destruction of the connector housing. If it is attempted to grasp the connector housing at its mating end and manipulate it with the intent of removing it from shell, the effort will be frustrated by the fact that the edge portions 27 of the shell extend into the grooves 46 and the flap 48 will fully occupy the upper portion 24 of the opening with the shoulders 54 closely adjacent to the edges of the opening.

Figure 2:
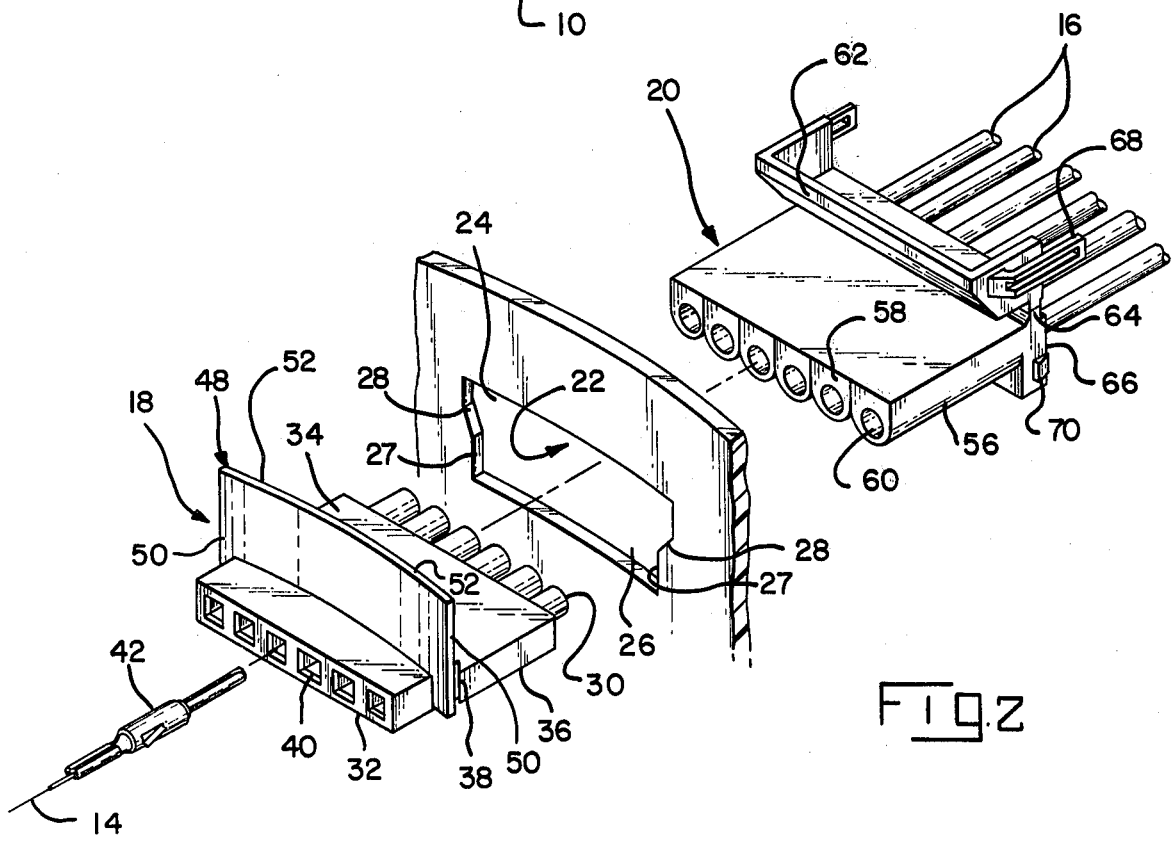
FIG. 2 is a fragmentary perspective view showing the connector exploded from the stator shell and showing a complementary connector.

The complementary connector 20 comprises a housing 56 having a mating face 58, contact receiving cavities 60, and a wire entry face 66. The disclosed complementary connector 20 has an integral hood 62 supported by an integral hinge 64 at the wire entry face of the housing. This hood can be swung downwardly from the position of FIG. 2, thereby to provide some protection for the wires 16 and prevent the splashing of water into the cavities 60. The hood is latched in its operative position by latch arm 68 and latch ears 70.

A significant advantage of the invention is that the ends 14 of the windings are directly connected to the terminals 42 and the connector 18 can be mounted in the opening 22 immediately after the terminals have been inserted into the housing of the connector 18. The motor stator 2 can then be passed along a production line without the inconvenience of the presence of loose insulated wires crimped onto the coil windings 14. As previously mentioned, the connector 18 cannot be removed from the shell from the outside, but it can be removed, if necessary for repair, from the inside, after removing the cover member which is assembled to the stator at the upper end.

What is claimed is:

1. An electrical connector mounted in a panel member, said connector being of the type comprising an insulating housing of firm plastic material having a mating face and a wire entry face, said housing having external walls extending between said faces and having at least one contact terminal therein, a wire extending into said wire entry face and connected to said terminal, said connector and panel being characterized in that:
   said panel has an opening therein, said opening having a connector retaining portion and a connector assembly portion,
   said connector retaining portion having an outline which conforms to the outline of a selected transverse cross-section of said housing, said retaining portion having opposed edge portions which are spaced apart by a distance which is substantially equal to, or less than, the distance between the two oppositely directed external wall portions of said selected cross-section of said housing which correspond to said opposed edge portions,
   said housing having slot means in said oppositely directed external wall portions, said slot means having a width sufficient snugly to receive opposed edge portions of said connector retaining portion of said opening,
   said housing being positioned in said connector retaining portion of said opening with said opposed edge portions extending into said slot means,
   said connector assembly portion of said opening being dimensioned freely to admit said housing therethrough, said housing having been assembled to said panel by passing said housing through said connector assembly portion and thereafter moving said housing laterally of its axis into said connector retaining portion, and
   a closure flap integral with, and extending substantially normally from, the external wall portion of said housing which is between said oppositely directed external wall portions, said closure flap conforming to, and being in covering relationship to, said connector assembly portion of said opening.

2. An electrical connector mounted in a panel as set forth in claim 1, said housing having a rectangular cross-section having oppositely directed sidewalls and oppositely directed endwalls extending between said faces, said endwalls comprising said oppositely directed external wall portions.

3. An electrical connector mounted in a panel as set forth in either of claims 1 or 2, said closure flap having a rabbeted periphery, whereby a reduced thickness margin is provided on said flap with a recessed shoulder extending along the periphery of said flap, the plane of said closure flap overlapping the plane of said panel with the recessed shoulder of said rabbeted periphery being opposed and adjacent to the edge of said connector assembly portion of said opening and with the reduced thickness margin of said flap being in overlapping relationship to said connector assembly portion of said opening.

4. An electrical connector mounted in a panel as set forth in claim 3, said panel comprising the cylindrical shell of an electrical motor stator.

5. An electrical connector mounted in a panel as set forth in claim 4, said stator having coil windings therein, said windings extending to terminals in said housing.

6. An electrical connector mounted in a panel as set forth in claim 5, said housing being mounted in said cylindrical shell adjacent to one end thereof, said connector assembly portion of said opening being proximate to said one end of said shell and said connector retaining portion being relatively remote from said one end whereby said housing can be tilted during passage of said housing through said opening during mounting of said housing in, and removal of said housing from, said shell.

* * * * *